(12) United States Patent
Ayala

(10) Patent No.: US 10,565,973 B2
(45) Date of Patent: Feb. 18, 2020

(54) AUDIO WAVEFORM DISPLAY USING MAPPING FUNCTION

(71) Applicant: Home Box Office, Inc., New York, NY (US)

(72) Inventor: Hugo Ayala, Rye Brook, NY (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 16/223,893

(22) Filed: Dec. 18, 2018

(65) Prior Publication Data

US 2019/0378487 A1 Dec. 12, 2019

Related U.S. Application Data

(60) Provisional application No. 62/681,457, filed on Jun. 6, 2018.

(51) Int. Cl.
*G10H 7/08* (2006.01)
*G10H 7/00* (2006.01)

(52) U.S. Cl.
CPC ............ *G10H 7/08* (2013.01); *G10H 7/008* (2013.01); *G10H 2220/116* (2013.01); *G10H 2250/165* (2013.01)

(58) Field of Classification Search
CPC .... G10H 7/08; G10H 7/008; G10H 2220/116; G10H 2250/165
USPC .................................................. 84/607, 604
See application file for complete search history.

(56) References Cited

U.S. PATENT DOCUMENTS

| 4,813,326 | A | * | 3/1989 | Hirano | G10H 7/00 84/624 |
| 4,868,869 | A | * | 9/1989 | Kramer | G10H 1/0091 381/61 |
| 4,991,218 | A | * | 2/1991 | Kramer | G10H 1/0091 381/61 |
| 6,101,469 | A | * | 8/2000 | Curtin | G10H 7/10 704/207 |
| 6,504,935 | B1 | * | 1/2003 | Jackson | G10H 1/125 381/61 |

(Continued)

OTHER PUBLICATIONS

International Search Report and Written Opinion received for PCT Application Serial No. PCT/US2019/035625 dated Aug. 14, 2019, 16 pages.

(Continued)

*Primary Examiner* — David S Warren
(74) *Attorney, Agent, or Firm* — Amin, Turocy & Watson, LLP

(57) ABSTRACT

The described technology is generally directed towards providing a visible waveform representation of an audio signal, by processing the audio signal with a polynomial (e.g., cubic) mapping function. Coefficients of the polynomial mapping function are predetermined based on constraints (e.g., slope information and desired range of the resultant curve), and whether the plotted audio waveform corresponds to sound field quantities or power quantities. Once the visible representation of the reshaped audio waveform is displayed, audio and/or video editing operations can be performed, e.g., by time-aligning other audio or video with the reshaped audio waveform, and/or modifying the reshaped audio waveform to change the underlying audio data.

20 Claims, 10 Drawing Sheets

(56) References Cited

U.S. PATENT DOCUMENTS

| | | | |
|---|---|---|---|
| 8,938,387 B2* | 1/2015 | Hedelin | G10L 19/008 |
| | | | 704/219 |
| 9,076,457 B1 | 7/2015 | Orler | |
| 10,057,702 B2* | 8/2018 | Geiger | H04S 1/002 |
| 10,192,536 B1* | 1/2019 | Jia | G10H 1/0008 |
| 2008/0243518 A1* | 10/2008 | Oraevsky | G10L 19/0204 |
| | | | 704/500 |
| 2013/0167026 A1 | 6/2013 | Shafer et al. | |
| 2013/0282383 A1* | 10/2013 | Hedelin | G10L 19/035 |
| | | | 704/500 |
| 2016/0328501 A1* | 11/2016 | Chase | G06F 17/5036 |
| 2017/0272881 A1* | 9/2017 | Geiger | H04S 1/002 |
| 2018/0351515 A1* | 12/2018 | Lesso | H03F 1/3258 |

OTHER PUBLICATIONS

Wei et al., "Dynamic Range Compression Characteristics Using an Interpolating Polynomial for Digital Audio Systems", IEICE Transactions on Fundamentals of Electronics, Communications and Computer Sciences, vol. E88-A, No. 2, Feb. 1, 2005, pp. 586-589.

* cited by examiner

AUDIO WAVEFORM DISPLAY USING MAPPING FUNCTION

CROSS-REFERENCE TO RELATED APPLICATION

This application is a non-provisional of pending U.S. Provisional Patent Application No. 62/681,457, filed on Jun. 6, 2018, entitled "AUDIO WAVEFORM DISPLAY USING MAPPING FUNCTION." The entirety of the aforementioned application is hereby incorporated by reference herein.

BACKGROUND

The visual display of audio waveforms is useful for many tasks. One such task includes aligning multiple audio tracks with other audio or video content.

Converting an audio signal to a visual representation (i.e., a waveform) involves choices. This is because humans have the ability to perceive sounds over a wide range such that the amplitude of loudest sound is millions of times greater than the amplitude of the smallest one. When the amplitude of these sound signals is plotted along the vertical axis against time in the vertical axis, the detail of the sounds with small amplitudes is rendered so small as to be visually imperceptible. Alternatively, if instead of plotting the value of the amplitude, the logarithm of the amplitude is plotted, the smaller amplitudes (mostly noise) dominate the plot.

To get around this, most contemporary audio waveform displays (other than linear displays) show a clipped version of the logarithmic plot. That is, the plot will show the range from −60 dB to 0 dB (that is, 0.001, to 1). This results in waveforms that appear as lumpy blobs/bursts, which makes it difficult for a user to discern the different elements of sound, such as speech, special effects, and music.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is generally directed towards selecting an audio signal from audio data and mapping the audio signal to a reshaped audio waveform via a polynomial mapping function of at least degree three. Aspects can comprise outputting a visible representation of the reshaped audio waveform, and receiving editing instructions associated with the reshaped audio waveform Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
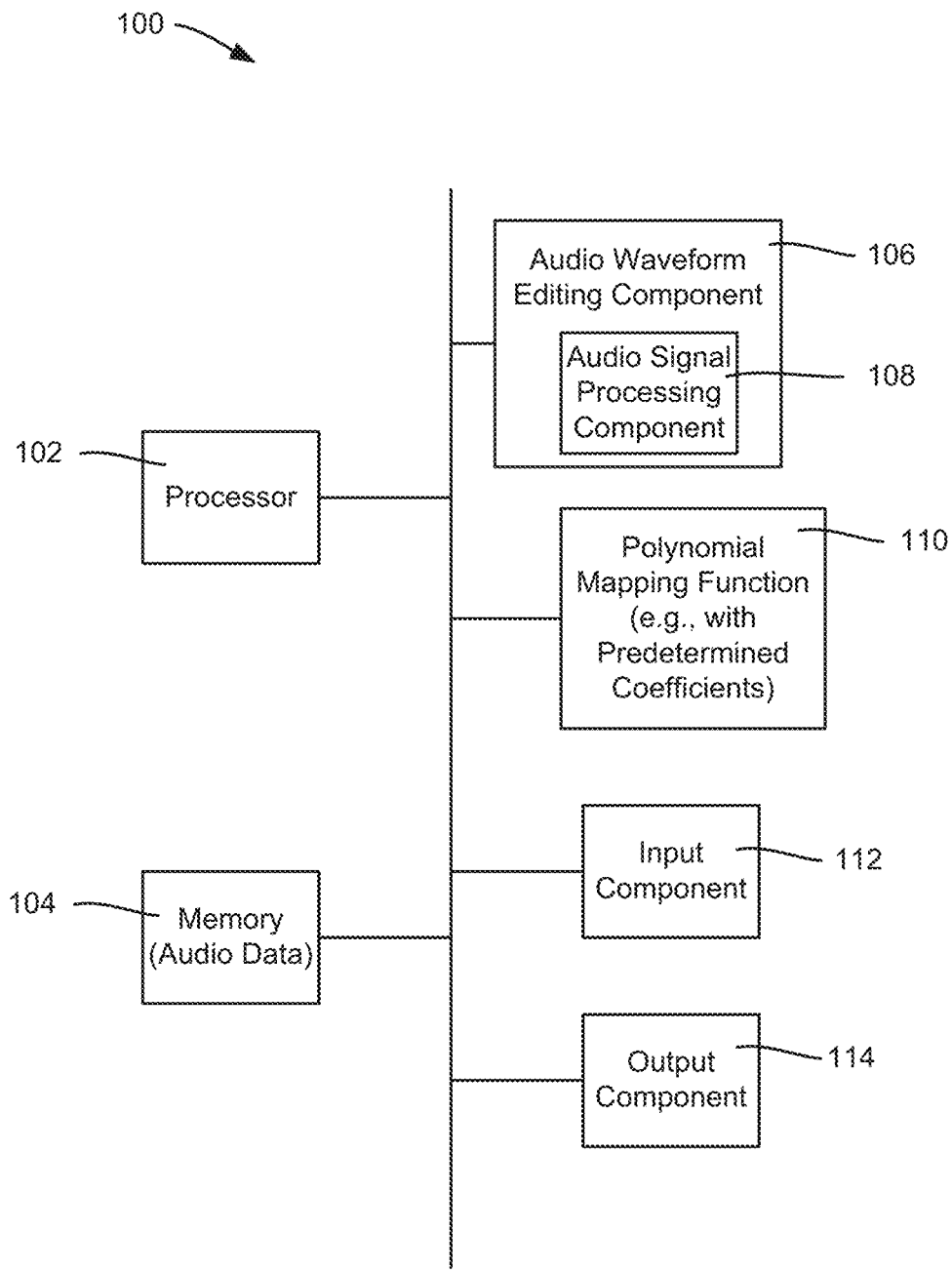
FIG. 1 is an example block diagram representation of components that provide for processing an audio signal into a displayed representation of the audio signal such as for editing, according to one or more example implementations.

Various aspects of the technology described herein are generally directed towards reshaping audio waveforms for displaying by mapping an audio signal to be displayed through a polynomial mapping function to produce a visible representation of the audio waveform. The mapping function, which in one implementation is at least a polynomial of degree three (note that sometimes "degree" is referred to as "order"), and thus can be a cubic mapping function, allows users to better distinguish the features of an audio signal, including visibly discerning speech, music, noise and or other effects from one another. The coefficients of the polynomial can be predetermined as described herein, and can be selected so as to limit the resulting curve within a desired range/domain.

By way of example, consider that a user is dubbing in one language instead of another with respect to a video such as a movie, television show, television commercial or the like. To locate an appropriate portion of the speech, a user can listen to the existing audio, stop at an approximate location where the dubbing is needed and speak. However, to more precisely line up the dubbed speech with the existing speech, the user can look at a plotted waveform and if needed do another take. In general, if the character's mouth is seen moving (with the original speech) in the video, the better the alignment of the dubbed in speech, the better and more realistic the dubbed-in audio appears to be.

The technology described herein, based on a cubic (or a higher polynomial) mapping function, helps the user to discern sounds from one another, such speech from other sounds, including music, loud noises such as an explosion or siren, effects (e.g., a dubbed-in explosion or siren) and so on. Moreover, the technology described herein helps the user visualize separate elements of such speech, such as the different syllables spoken by a character and other sounds that the character may make, e.g., a chuckle that is intended to be heard; this helps align the dubbed-over audio with the original audio. Indeed, an alignment tool operated by another user can move the new audio/speech elements into more direct alignment with the original audio elements, including long after the person who provided the dubbed audio has finished his or her speaking role.

It should be understood that any of the examples herein are non-limiting. For instance, locating the correct audio waveform for aligning new speech or other new audio with prior speech or other prior audio is one beneficial use of the technology, but any technology that benefits from viewing audio waveforms or data that, like audio, can span multiple orders of magnitude, can benefit from the technology described herein. Indeed, any application that displays audio waveforms or other similar waveforms with wide ranges in amplitude (that are often displayed logarithmically) can benefit from the technology described herein, including editing applications, entertainment-type applications and so forth. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data editing in general.

FIG. 1 is a block diagram representing an example system 100 of components that can be used to implement various aspects of the technology described herein. A processor 102 and memory 104 are coupled to an audio waveform editing component 106 that comprises an audio signal processing component 108. The processor 102 can represent one or more processors, and the memory 104 can represent any volatile or non-volatile storage, or a combination thereof. The memory 104 contains audio data to be processed as described herein.

As described herein, the audio signal processing component uses a polynomial mapping function 110 (e.g., with predetermined coefficients as determined herein). To be of practical use, the polynomial mapping function 110 is at least a cubic (degree three) polynomial, although it is feasible that a degree two (quadratic) polynomial could provide some benefit relative to linear output.

Also shown in FIG. 1 is an input component 112, such as comprising any input device or devices; non-limiting examples include a keyboard, mouse, touch-screen, touchpad, other pointing device (e.g., pen or stylus) and/or microphone. An output component 114 is also shown in FIG. 1, and is typically a display device capable of displaying an audio signal as a reshaped waveform as described herein, although a printer/plotter can also be used as an output component, such as if a more permanent representation of the waveform is desired. The represented output component 112 can also comprise a speaker, which is useful when processing audio (e.g., to coarsely locate a relevant portion of audio within a large audio file).

Figure 2:
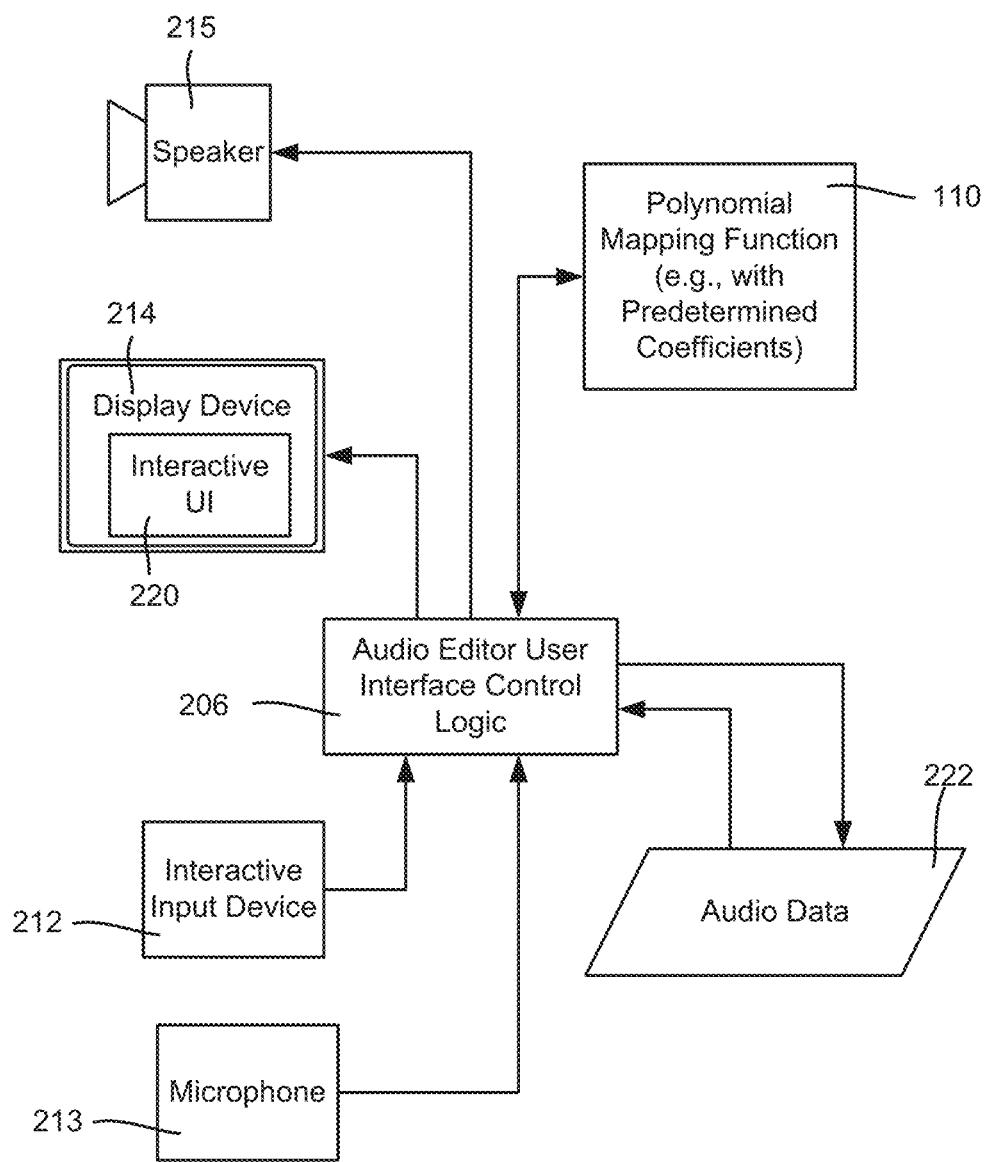
FIG. 2 is a representation of an example interactive interface control logic by which audio data can be processed into displayed representations of audio signals of the audio data, such as for editing, according to one or more example implementations.

FIG. 2 is a block diagram representing an example implementation that can be used in video production and/or audio processing, in which an audio editor (comprising audio editor user interface control logic) 206 reshapes audio data 222 via the polynomial mapping function 110. The editor is interacted with via a suitable interactive input device 212, and can be coupled to a microphone 213, such as for receiving voice commands, as well as for receiving new audio to use in conjunction with the audio data 222. For example, the dubbed in audio can be received, manipulated (e.g., aligned) via the editor 206, and added to the audio data 222 as a secondary track. It is also feasible to replace or mix existing audio data with newly received audio data, (which may be prerecorded), e.g., a special effect that replaces or is mixed with the audio that was initially recorded.

The exemplified display device can provide an interactive user interface (UI) 220, e.g., rendered on a display device 214, to assist with the editing. Note that the editing can be for video production and/or audio processing; for example, audio can be realigned with video, such as when dealing with older movies in which the video and audio are slightly misaligned in time. Video can also be edited via the interactive user interface 220, independent or in addition to audio editing. A speaker 215 is exemplified in FIG. 2, which can comprise one or more speakers, headphones or earpieces, as audio output is usually highly useful when audio editing.

Turning to the aspects related to the polynomial mapping function, described herein is how an audio waveform can be displayed in a more intuitive form. A general problem with displaying audio waveforms is a result of the nature of sound and other such data, which is able to span multiple orders of magnitude; (e.g., audio signals can range over several orders of magnitude, for instance an explosion can be more than ten times louder than a voice).

As described above, the decibels of the audio signal are typically plotted, rather than a linear plot of the audio signal itself. The basic formula for computing the decibels is:

$$y(x) = K \cdot \log_{10}(x) \qquad (1)$$

where the value of x represents the signal normalized to the maximum value, and the value of K is 10 for power (e.g., RMS) quantities, or 20 for sound field (e.g., amplitude) quantities. For instance, when plotting a sound wave, the RMS value of the waveform is plotted using K=10, while the maximum amplitude of the waveform is plotted with K=20.

The value of x is the normalized value of the waveform compared to some maximum value. For instance, for a 24-bit PCM encoded audio, the value x corresponds to x=s/8,388,607, where the value of 8,388,607 is equal to $2^{23}-1$ (the top bit is used as a sign bit).

A next operation in reshaping audio data is to convert the value of x at each sample point into a value (e.g., h), where in one or more implementations the value of h=1 corresponds to the maximum amplitude (e.g., y=1) when plotted, and the value of h=0 corresponds to the value of y=−40 dB and lower. This can be done by adding 40 to Equation (1) and dividing by 40 (based on $\log_{10}(x)=\ln(x)/\ln(10)$):

$$h(x) = 1 + \frac{K}{40} \frac{\ln(x)}{\ln(10)} \qquad (2)$$

The derivative is taken as well, in anticipation of the need to establish boundary conditions:

$$\frac{dy(x)}{dx} = \frac{K}{40\ln(10)} \frac{1}{x}. \qquad (3)$$

A next step is to set up some boundary conditions on these equations. In one or more implementations, it is desired to approximate this function in the range [0 −1], noting that $$h(0) = 0 \quad (4)$$

$$h(1) = 1 \quad (5)$$

$$h'(1) = \frac{K}{40\ln(10)}. \quad (6)$$

To use a cubic approximation, one more constraint is needed. One possible choice is to set the value of the derivative of y at x=0; however because the value of $$\frac{dy}{dx}$$

is infinite at x=0, a different constraint is needed. Thus, another choice is to have the slope of the function equal the slope of the function at the value of x that corresponds to −40 dB; this value is referred to herein as $x_0$.

$$h'(0)=y'(x_0). \quad (7)$$

To solve for $x_0$, using Equation (1) provides $$\ln x_0 = \frac{-40\ln(10)}{K}. \quad (8)$$

Exponentiating both sides results in $$x_0 = \exp\left(\frac{-40\ln(10)}{K}\right). \quad (9)$$

Substituting for $x_0$ in Equation 7 results in $$h'(0) = \frac{K}{40\ln(10)} \cdot \frac{1}{\exp(-40\ln(10)/K)}. \quad (10)$$

Note that everything in Equation (10) is a constant, whereby the values for y'(0) for both K=10 and K=20 can be computed:

$$h'(0)=1085.7362(K=10) \quad (11)$$

$$h'(0)=21.714724(K=20). \quad (12)$$

Consider an h of the polynomial (degree three) form:

$$h(x)=Ax^3+Bx^2+Cx+D. \quad (13)$$

The constant D is zero, given Equation (4). Further, A+B+C=1 from Equation (5) (based on conserving energy), and Equation (6) gives 3A+2B+C=L, where $$L = \frac{K}{(40\ln(10))}.$$

Lastly, the value of C can be fixed by the constraints given by Equations (11) and (12). Solving for this for both K=10 and K=20 yields:

|   | K = 10     | K = 20     |
|---|------------|------------|
| A | 1084.7362  | 20.714724  |
| B | −2169.4724 | −41.429448 |
| C | 1085.7362  | 21.714724  |
| D | 0          | 0          |

However, with the above coefficients, the curve produced wanders outside of the desired range [0 −1]. One way to solve this is to add more terms to Equation (13) and produce a higher degree polynomial than the cubic function of Equation (13). However, for a straightforward routine that reshapes the sound data into something more visibly understandable, a suitable alternative is to determine alternative coefficients can be chosen that limit the curve to stay within the desired range/domain. Based on experimentation, a (slope) value of h'(0)=3 creates a highly desirable and useful display. Thus, using this value of h'(0)=3 results in the following coefficients:

|   | K = 10   | K = 20   |
|---|----------|----------|
| A | 1.10857  | 1.217147 |
| B | −3.10857 | −3.217147|
| C | 3        | 3        |
| D | 0        | 0        |

As is understood, the above coefficient values can be computed to additional precision, or rounded to less precision and still provide reasonable results.

Thus, for any signal value x, a desirably visible waveform is generated (when using K=10) for power quantities by the mapping function:

$$h(x)=1.10857x^3-3.10857x^2+3x. \quad (14)$$

Similarly, (when using K=20 for field quantities), a visibly desirable waveform is generated by the mapping function:

$$h(x)=1.217147x^3-3.217147x^2+3x. \quad (15)$$

Figure 3:
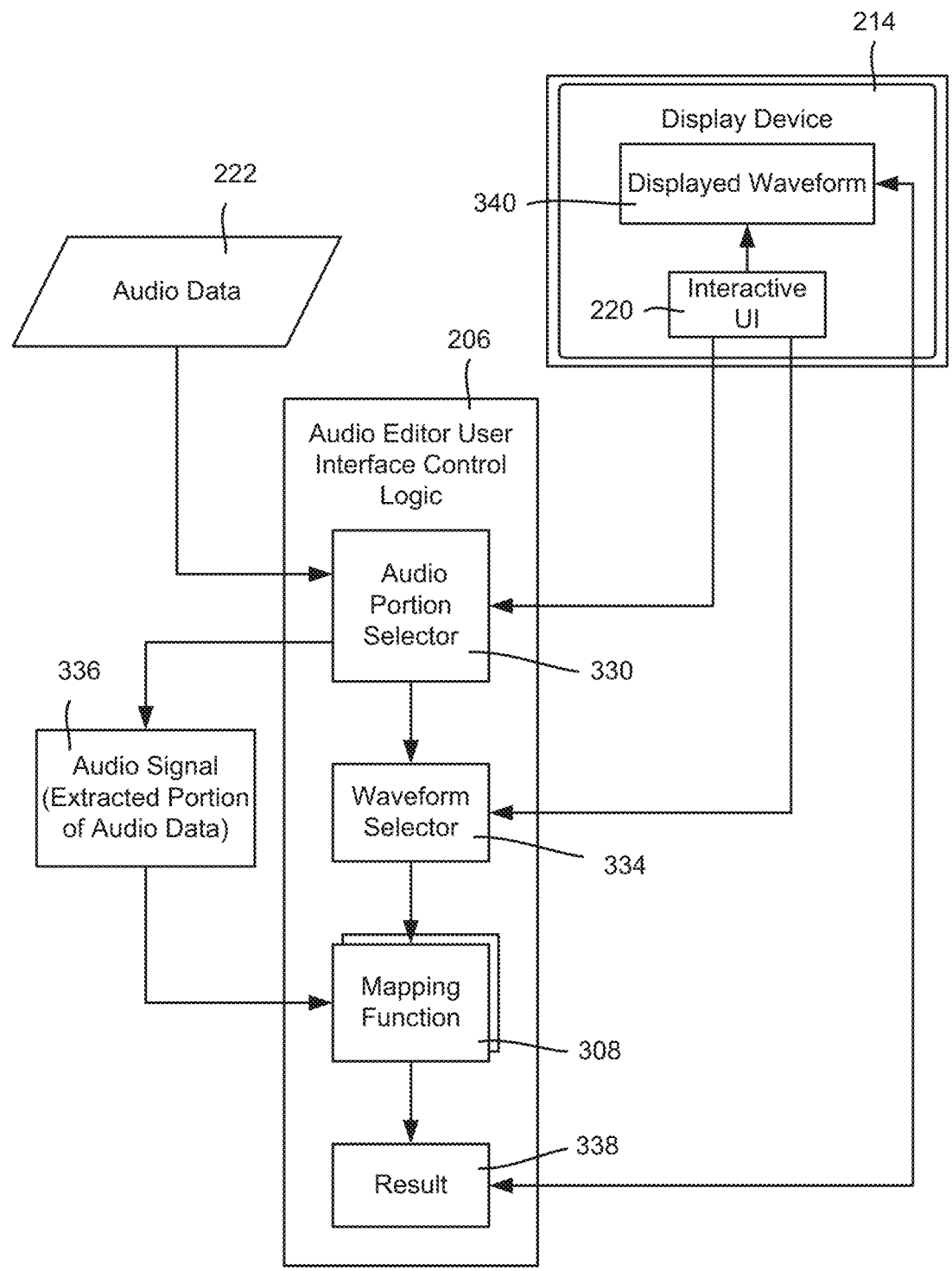
FIG. 3 is a representation of an example interactive interface control logic components for processing audio signals in audio data into displayed waveform representations for editing, according to one or more example implementations.

FIG. 3 shows an example of using mapping functions to reshape audio data into a visible waveform, including the cubic mapping function of Equation (13) (with different A and B coefficients for field and power quantities). In general, the audio data 222 is made accessible to the audio editor logic 206, which can go forward or backward through the audio data to select a relevant portion, e.g., as represented via block 330. Note that it is feasible to process an entire audio file into the reshaped waveform if desired, however it is typically more efficient to work on a portion of the file, e.g., to reshape and display a smaller part of an audio signal 336 extracted from the larger audio data 222 that is relevant to a particular editing task.

Figure 4A:
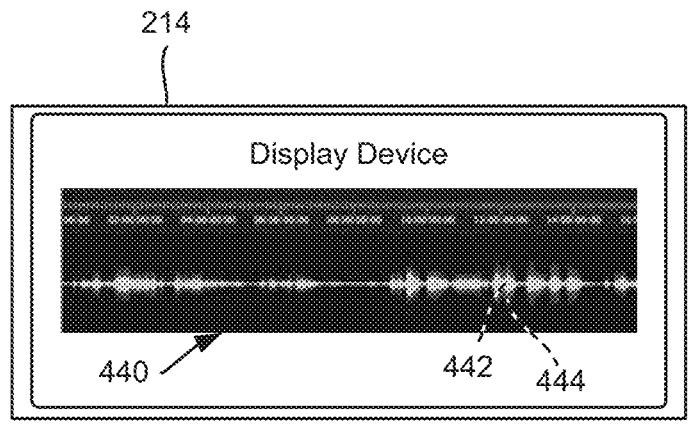
FIGS. 4A-4C comprise visible representations of waveforms produced by via cubic mapping plotting, clipped logarithmic plotting and plotting, according to one or more example implementations.
Figure 4B:
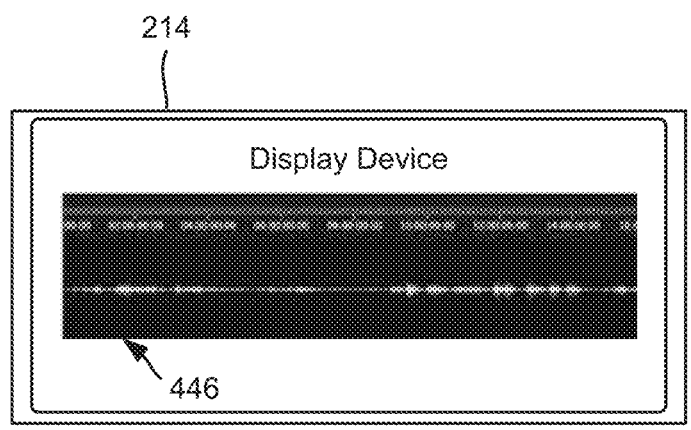
Figure 4C:
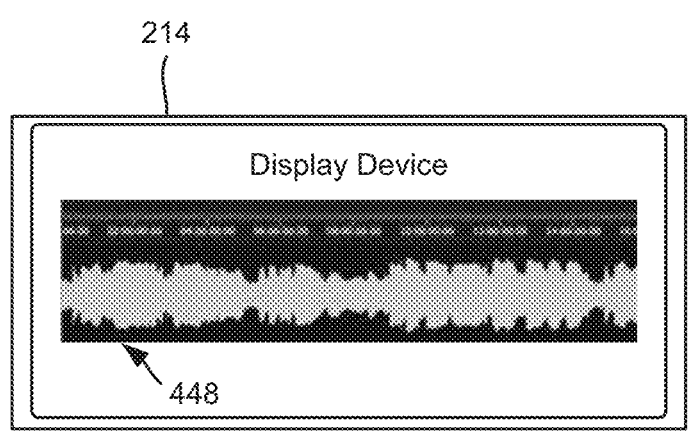

As shown in FIG. 3, the exemplified audio editor logic 206 provides a waveform selector, by which a user can select to view a waveform 440 (FIG. 4A) that results from reshaping via the cubic mapping function, view a linear waveform 446 (FIG. 4B), or a (e.g., clipped) logarithmic waveform representation 448 (FIG. 4C). A user can also select the K=10 mapping function coefficients to view the power quantities waveform, select the K=20 mapping function coefficients to view the field quantities waveform, or both.

The result of processing the x-values sampled in time that make up the audio signal is shown as result block 338, which can be plotted as a displayed waveform 340 on the display device 214. In this example, a user can edit the waveform 340 via the interactive user interface 220.

Turning to example waveforms represented in FIGS. 4A-4C, it is seen that the cubic mapping function described herein provides more distinct information in the plot 440 (FIG. 4A) relative to the linear plot 446 (FIG. 4B) or the logarithmic plot 448 (FIG. 4C). Note that FIG. 4A shows both the power quantities waveform exemplified by the light gray signal 442 mapped via equation (14) and the field quantities waveform exemplified by the dark gray signal 444 mapped via equation (15).

Figure 5:
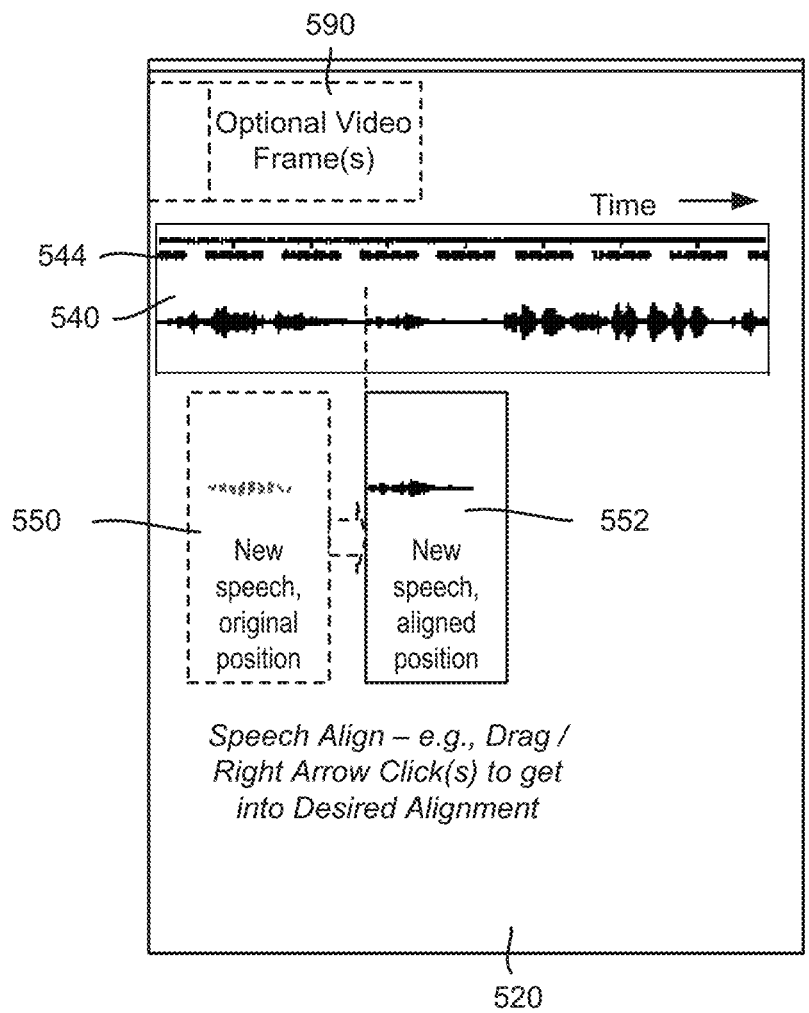
FIG. 5 comprises an example interactive editing tool for manipulating a displayed waveform, according to one or more example implementations.

FIG. 5 shows an example editing interface 520, which in this example allows for the aligning of audio, e.g., new speech displayed in box 550, with respect to an existing displayed waveform 540. Time labels 544 can extend across the time axis. An example use of the editing interface is the synchronization of audio and video events; (this is shown as optional in FIG. 5, with the size of the video frame(s) 590 not necessarily shown to any scale or intended to convey relative size with respect to the audio waveform). Another example use is modifying audio content in general, which can be independent of video content.

In the example of FIG. 5, a user moves (e.g., drags or clicks right cursor keyboard arrows or interactive arrows, not shown) to align the new speech box 550 in time with the existing waveform, e.g., by adjusting the timecodes associated with the new speech. It is also straightforward to more directly edit timecodes associated with the new speech to match the timing data of the displayed waveform. Editing tools such as reset/cancel/undo/redo and the like are not explicitly shown, but are understood to be present in one or more implementations.

Other, non-limiting ways to edit audio include replacing an existing audio waveform with new waveform data, which is then saved to a larger audio file. Another straightforward way to modify an audio signal is to simply re-record the audio as desired. Editing can be used to change the time codes associated with an audio signal in the underlying data, e.g., to cut out a portion of the waveform 540 displayed in FIG. 5, move a portion, insert a new portion, and so on. A waveform also may be compressed or expanded in time, amplified or attenuated, and so on, which can be recombined in some way with the original audio data, e.g., and saved to a new audio data file.

Although not explicitly shown in FIG. 5, it is understood that concepts such as color, vertical scale adjustment, horizontal scale adjustment (zooming in or out of a time window) and the like are straightforward to implement. Labels, hash marks, legends and so forth may be selectively displayed or selectively removed from being displayed. Fast forward, rewind, jump ahead or back, and the like, whether by interacting to fast forward audio and/or video (if present) is another capability that can be provided in a straightforward manner.

Figure 6:
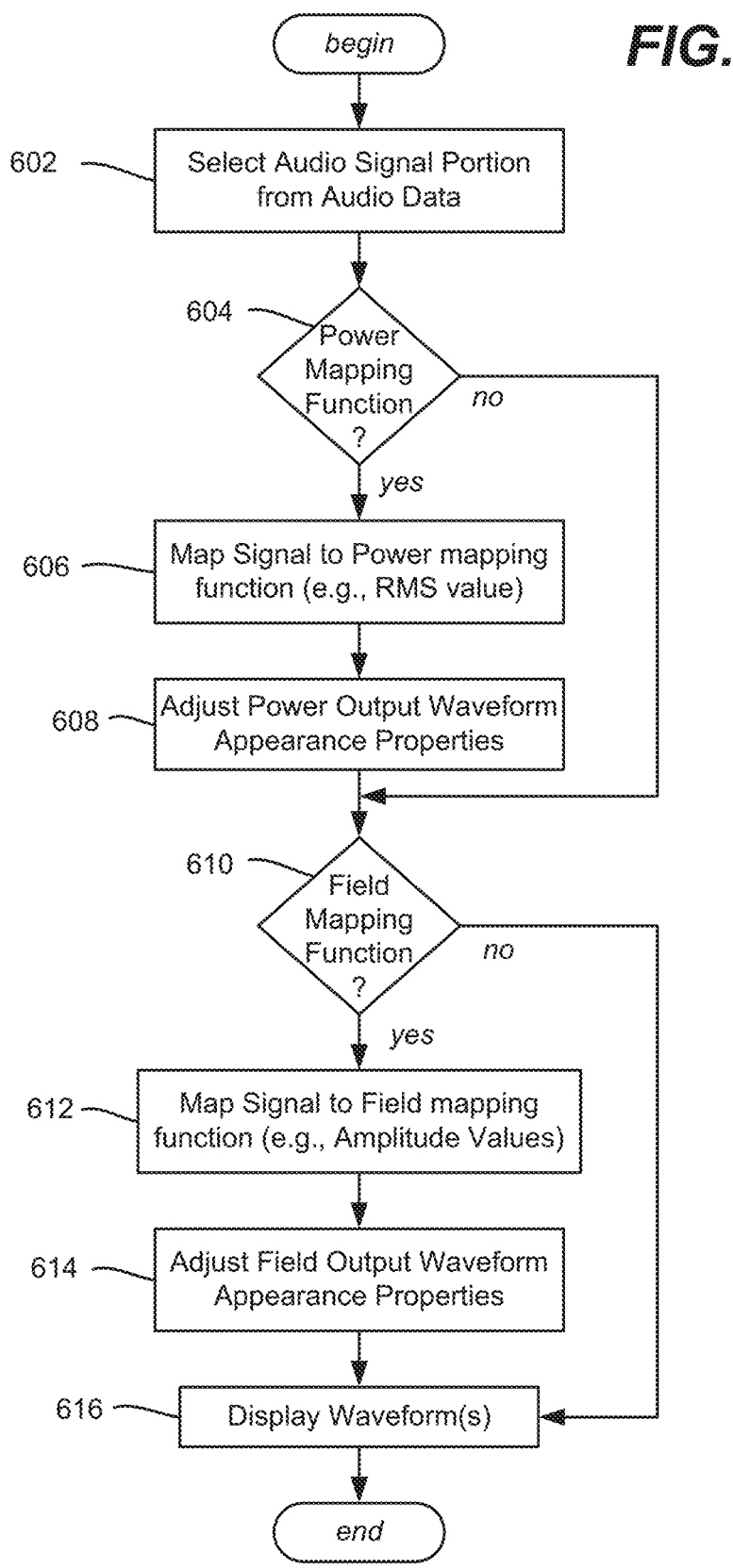
FIG. 6 is a flow diagram showing example logic/operations corresponding to processing an audio signal based on polynomial mapping functions of at least degree three with predetermined coefficients, according to one or more example implementations.

FIG. 6 is a flow diagram showing example operations of an editor (e.g., the audio editor user interface control logic 206 of FIGS. 2 and 3). It is understood that these operations are only some possible, non-limiting examples, and that in a given interface configuration, different operations may be present, less than those operations exemplified in FIG. 6 may be present, and/or additional operations may be present. Further note that the exemplified ordering of many of the operations can be different.

Operation 602 represents selecting an audio signal, e.g., a relevant portion of a larger set (file) of audio data; (although as mentioned above, the entire audio data can be selected). This can be by listening, scrubbing, entering timing data and so forth to obtain an audio signal corresponding to a desired time range.

Operation 604 evaluates whether the user wants to view the power quantities waveform. If so, operation 606 maps the selected audio signal portion to the power mapping function. Note that this can be a higher degree polynomial than the cubic mapping function of Equation (13), but in any event the coefficients can be predetermined as described herein providing for highly efficient reshaping of the audio signal data into the desired waveform. Operation 608 is directed towards adjusting the visible properties of the reshaped output waveform, e.g., color, shading, contrast, brightness and so on so as to differentiate the waveform from a waveform generated by the sound field mapping function if the user elects to view both simultaneously. Note that the visible properties can be user configurable, and indeed, can be changed dynamically during editing.

Operation 610 evaluates whether the user wants to view the sound field quantities waveform. If so, operation 612 maps the selected audio signal portion to the sound field mapping function. Again, this can be a higher degree polynomial than the cubic mapping function of Equation (13), but in any event the coefficients can be predetermined as described herein providing for highly efficient reshaping of the audio signal data into the desired waveform. Operation 614 is similarly directed towards adjusting the visible properties of the reshaped output waveform, e.g., color, shading, contrast, brightness and so on so as to differentiate the sound field quantities waveform from the power quantities waveform if both are being displayed. Again, such visible properties can be user configurable.

Operation 616 displays the waveform or waveforms. At this time the user can edit the audio data by manipulation or other editing operations with respect to the displayed waveform(s) as described herein.

Figure 7:
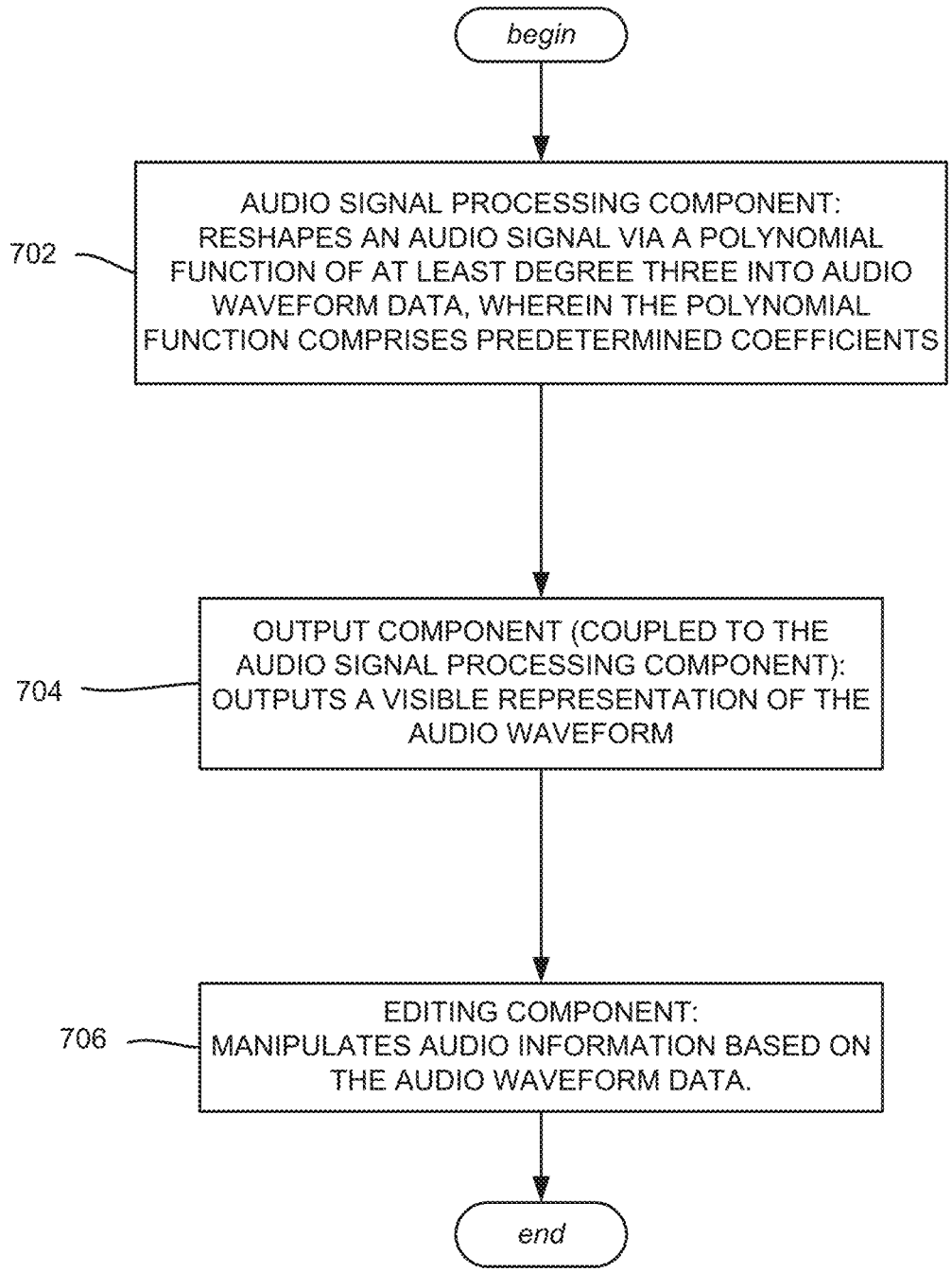
FIG. 7 is a block diagram showing example logic/operations corresponding to audio signal processing components, according to one or more example implementations.

One or more aspects, summarized in FIG. 7, are directed towards an audio signal processing component (block 702) that reshapes an audio signal via a polynomial function of at least degree three into audio waveform data, wherein the polynomial function comprises predetermined coefficients. An output component (block 704), is coupled to the audio signal processing component, to output a visible representation of the audio waveform. An editing component (block 706) is provided that manipulates audio information based on the audio waveform data.

The polynomial function can be a degree three (cubic) polynomial function. The predetermined coefficients can sum to a value that corresponds to a range; e.g., the predetermined coefficients can sum to one. The value of a trailing coefficient of the predetermined coefficients can be based on a predetermined slope.

The predetermined coefficients can be determined based on mapping field quantities to the audio waveform data. The predetermined coefficients can be determined based on mapping power quantities to the audio waveform data.

Figure 8:
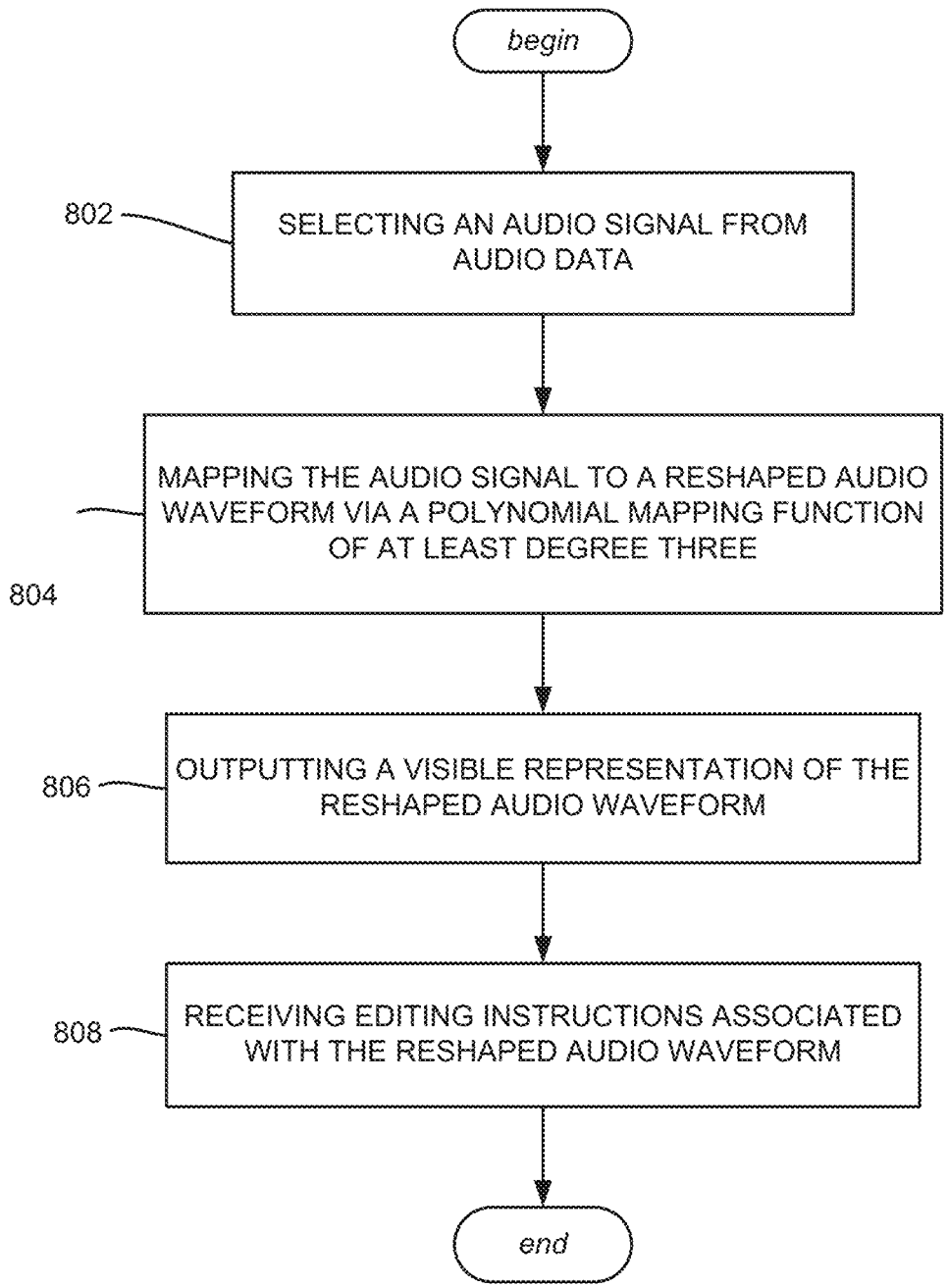
FIG. 8 is a flow diagram showing example logic/operations corresponding to audio signal processing using a polynomial mapping function, according to one or more example implementations.

One or more aspects, summarized in FIG. 8, are directed towards selecting (operation 802) an audio signal from audio data. Operation 804 represents mapping the audio signal to a reshaped audio waveform via a polynomial mapping function of at least degree three. Operation 806 represents outputting a visible representation of the reshaped audio waveform. Operation 808 represents receiving editing instructions associated with the reshaped audio waveform.

Other aspects can include precomputing coefficients for the polynomial mapping function based on constraints corresponding to slope information and range information, and a value corresponding to plotting power quantities. Still other aspects can include precomputing coefficients for the polynomial mapping function based on constraints corresponding to slope information and range information, and a value corresponding to plotting field quantities.

Mapping the audio signal to the reshaped audio waveform via the polynomial mapping function can comprise selecting the polynomial mapping function with coefficients corresponding to plotting power quantities. The reshaped audio waveform can be a first reshaped audio waveform, and aspects can comprise secondarily mapping the audio signal to a second reshaped audio waveform via the polynomial mapping function using coefficients corresponding to plotting field quantities, and outputting a visible representation of the second reshaped audio waveform in conjunction with the outputting the visible representation of the first reshaped audio waveform.

Mapping the audio signal to the reshaped audio waveform via the polynomial mapping function can comprise selecting the polynomial mapping function with coefficients corresponding to plotting field quantities. The reshaped audio waveform can be a first reshaped audio waveform, and aspects can comprise secondarily mapping the audio signal to a second reshaped audio waveform via the polynomial mapping function using coefficients corresponding to plotting power quantities, and outputting a visible representation of the second reshaped audio waveform in conjunction with the outputting the visible representation of the first reshaped audio waveform.

Receiving the editing instructions associated with the reshaped audio waveform can comprise time-aligning other audio data or video data with audio information represented in the reshaped waveform.

Figure 9:
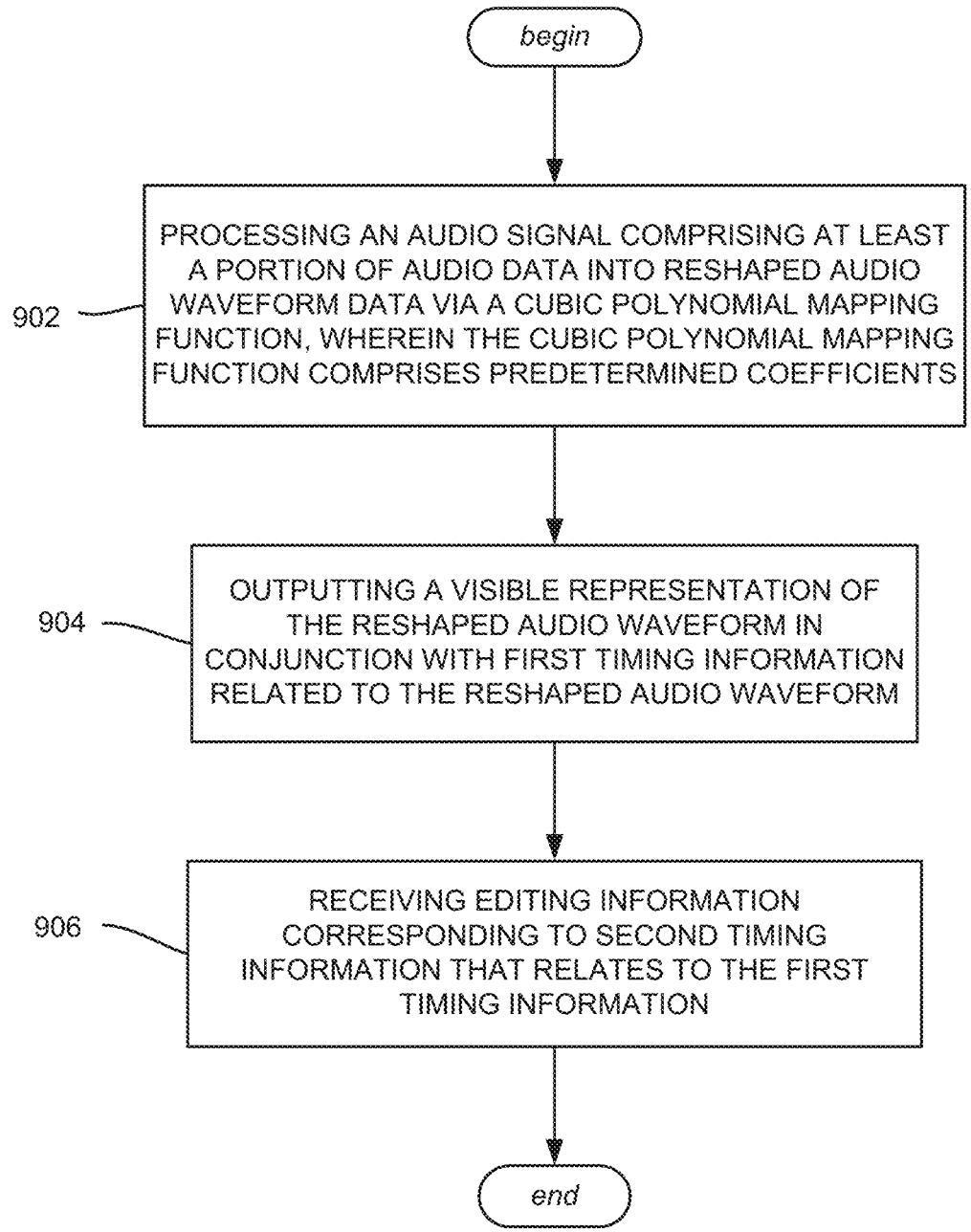
FIG. 9 is a flow diagram showing example logic/operations corresponding to audio signal processing using a polynomial mapping function of degree three, according to one or more example implementations.

Other aspects are summarized with reference to FIG. 9, and, for example, can correspond to operations, such as performed on a machine-readable storage medium, comprising executable instructions that, when executed by a processor facilitate performance of the operations. Operations can comprise processing (operation 902) an audio signal comprising at least a portion of audio data into reshaped audio waveform data via a cubic polynomial mapping function, wherein the cubic polynomial mapping function comprises predetermined coefficients. Operation 904 represents outputting a visible representation of the reshaped audio waveform in conjunction with first timing information related to the reshaped audio waveform. Operation 906 represents receiving editing information corresponding to second timing information that relates to the first timing information Receiving the editing information corresponding to the second timing information that relates to the first timing information can comprise time-aligning other audio signal data or time-aligning video signal data based on the first timing information related to the reshaped audio waveform.

Processing the audio signal via the cubic polynomial mapping function can comprise selecting a first set of coefficients for the cubic polynomial mapping function corresponding to plotting power quantities, or selecting a second set of coefficients for cubic polynomial mapping function corresponding to plotting field quantities.

As can be seen, a polynomial mapping function of at least degree three (cubic) reshapes audio data into a displayable waveform with more prominent, recognizable differences between different types of sounds (when compared to a linear or logarithmic display). Indeed, as one example sound effects and speech can be easily visualized and differentiated. The audio waveform display thus makes it easy to see speech, for example while not clipping the louder sounds such as music and sound effects. The result allows users to better see the features of speech and music, which creates a more visually telling representation and makes audio waveforms easier to work with. This is beneficial because many of editing fixes require the alignment of speech elements to video or other audio, which is simplified and sped up via the reshaped waveform described herein.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 18 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
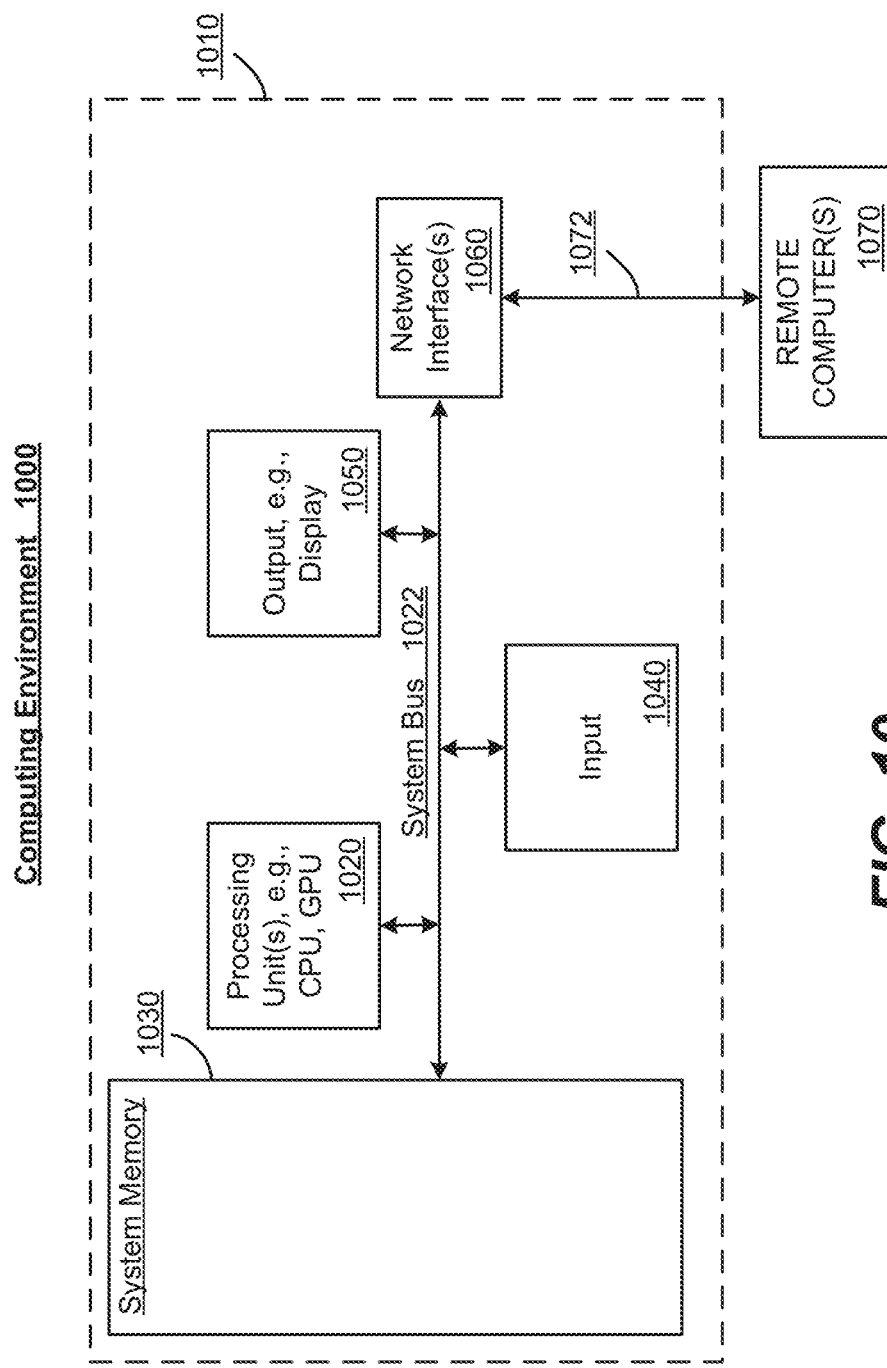
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/ buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising,
   an audio signal processing component that reshapes an audio signal via a polynomial function of at least degree three into audio waveform data, wherein the polynomial function comprises predetermined coefficients;
   an output component, coupled to the audio signal processing component, that outputs a visible representation of the audio waveform; and
   an editing component that manipulates audio information based on the audio waveform data.

2. The system of claim 1 wherein the polynomial function is a degree three polynomial function.

3. The system of claim 1 wherein the predetermined coefficients sum to a value that corresponds to a range.

4. The system of claim 1 wherein the polynomial function is a degree three polynomial function and wherein the predetermined coefficients sum to one.

5. The system of claim 1 wherein a value of a trailing coefficient of the predetermined coefficients is based on a predetermined slope.

6. The system of claim 1 wherein the predetermined coefficients are determined based on mapping field quantities to the audio waveform data.

7. The system of claim 1 wherein the polynomial function is represented as $Ax^3+Bx^2+Cx$, wherein the predetermined coefficients comprise coefficient A equal to approximately 1.10857, coefficient B equal to approximately $-3.10857$, and coefficient C equal to approximately 3.

8. The system of claim 1 wherein the predetermined coefficients are determined based on mapping power quantities to the audio waveform data.

9. The system of claim 1 wherein the polynomial function is represented as $Ax^3+Bx^2+Cx$, wherein the predetermined coefficients comprise coefficient A equal to approximately 1.217147, coefficient B equal to approximately $-3.217147$, and coefficient C equal to approximately 3.

10. A computer-implemented method, comprising,
selecting an audio signal from audio data;
mapping the audio signal to a reshaped audio waveform via a polynomial mapping function of at least degree three;
outputting a visible representation of the reshaped audio waveform; and
receiving editing instructions associated with the reshaped audio waveform.

11. The computer-implemented method of claim 10, further comprising, precomputing coefficients for the polynomial mapping function based on constraints corresponding to slope information and range information, and a value corresponding to plotting power quantities.

12. The computer-implemented method of claim 10, further comprising, precomputing coefficients for the polynomial mapping function based on constraints corresponding to slope information and range information, and a value corresponding to plotting field quantities.

13. The computer-implemented method of claim 10, wherein the mapping the audio signal to the reshaped audio waveform via the polynomial mapping function comprises selecting the polynomial mapping function with coefficients corresponding to plotting power quantities.

14. The computer-implemented method of claim 13, wherein the reshaped audio waveform is a first reshaped audio waveform, and further comprising, secondarily mapping the audio signal to a second reshaped audio waveform via the polynomial mapping function using coefficients corresponding to plotting field quantities, and outputting a visible representation of the second reshaped audio waveform in conjunction with the outputting the visible representation of the first reshaped audio waveform.

15. The computer-implemented method of claim 10, wherein the mapping the audio signal to the reshaped audio waveform via the polynomial mapping function comprises selecting the polynomial mapping function with coefficients corresponding to plotting field quantities.

16. The computer-implemented method of claim 15, wherein the reshaped audio waveform is a first reshaped audio waveform, and further comprising, secondarily mapping the audio signal to a second reshaped audio waveform via the polynomial mapping function using coefficients corresponding to plotting power quantities, and outputting a visible representation of the second reshaped audio waveform in conjunction with the outputting the visible representation of the first reshaped audio waveform.

17. The computer-implemented method of claim 10, wherein the receiving the editing instructions associated with the reshaped audio waveform comprises time-aligning other audio data or video data with audio information represented in the reshaped waveform.

18. A machine-readable storage medium, comprising executable instructions that, when executed by a processor facilitate performance of operations, the operations comprising:
processing an audio signal comprising at least a portion of audio data into reshaped audio waveform data via a cubic polynomial mapping function, wherein the cubic polynomial mapping function comprises predetermined coefficients;
outputting a visible representation of the reshaped audio waveform in conjunction with first timing information related to the reshaped audio waveform; and
receiving editing information corresponding to second timing information that relates to the first timing information.

19. The one or more machine-readable storage media of claim 18 wherein the receiving the editing information corresponding to the second timing information that relates to the first timing information comprises time-aligning other audio signal data or time-aligning video signal data based on the first timing information related to the reshaped audio waveform.

20. The one or more machine-readable storage media of claim 18 wherein the processing the audio signal via the cubic polynomial mapping function comprises selecting a first set of coefficients for the cubic polynomial mapping function corresponding to plotting power quantities, or selecting a second set of coefficients for cubic polynomial mapping function corresponding to plotting field quantities.

* * * * *